United States Patent
Stufano

[19]
[11] Patent Number: 5,879,044
[45] Date of Patent: Mar. 9, 1999

[54] APPARATUS AND METHOD FOR PROTECTING A WINDOW OR VEHICLE WINDSHIELD

[76] Inventor: Thomas J. Stufano, P.O. Box 852, Woodland Park, Colo. 80866

[21] Appl. No.: 918,567

[22] Filed: Aug. 22, 1997

Related U.S. Application Data

[60] Provisional application No. 60/048,026, May 28, 1997.

[51] Int. Cl.$^6$ ........................................................ B60J 1/20
[52] U.S. Cl. ...................................... 296/95.1; 160/370.21
[58] Field of Search ...................... 296/95.1; 160/370.21; 150/168

[56] References Cited

U.S. PATENT DOCUMENTS

| | | | |
|---|---|---|---|
| 4,768,823 | 9/1988 | Martinez | 296/95.1 |
| 4,811,982 | 3/1989 | Carlyle | 296/95.1 |
| 5,002,326 | 3/1991 | Westfield et al. | 296/95.1 |
| 5,376,443 | 12/1994 | Sijan et al. | 296/95.1 |
| 5,653,497 | 8/1997 | Campfield et al. | 296/95.1 |

*Primary Examiner*—Joseph D. Pape
*Attorney, Agent, or Firm*—Law Practice of Scott L. Lampert, P.A.; Scott L. Lampert

[57] ABSTRACT

An apparatus for protecting a vehicle windshield which is light-weight and virtually undetectable when secured to a windshield and a method for removably securing the apparatus to an existing windshield. The apparatus of the present invention comprises a main body formed of a substantially thin, clear material, such as plexiglass, of a one-piece construction. The main body includes a top face and a bottom face and is structured and sized to lie in an overlying relation upon a vehicle windshield. The main body may be of generally flat rectangular configuration for use with flat windshields or curved rectangular configuration for use with curved windshields. The apparatus is removably secured to an existing windshield by applying an adhesive material to the main body and positioning the main body onto the windshield in overlying relation thereto, so that the bottom face of the main body is in substantially direct contact with the outer surface of the windshield.

9 Claims, 2 Drawing Sheets

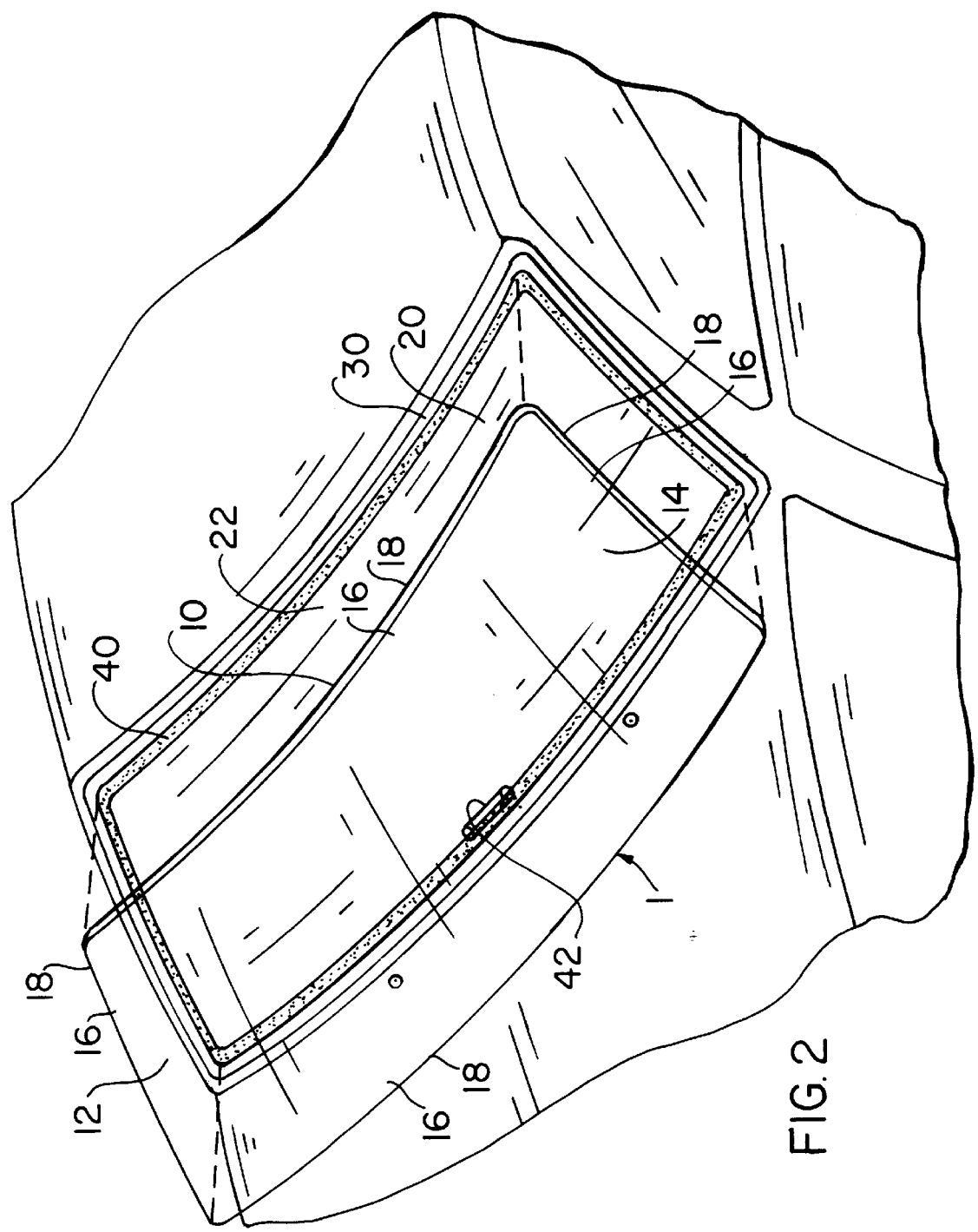

APPARATUS AND METHOD FOR PROTECTING A WINDOW OR VEHICLE WINDSHIELD

This application claims the benefit of U.S. Provisional Application No. 60/048,026, filed May 28, 1997, which has not previously been patented or abandoned.

BACKGROUND OF THE INVENTION

1. Field of the Invention

The present invention relates to an apparatus for protecting a window and a method for removably securing the apparatus to a window.

2. Description of the Related Art

It is well known that the chipping or cracking of automobile windshields is a common occurrence. Almost every automobile windshield, at some point or another, is pelted by rocks, pebbles or other objects propelled by other vehicles from the road or falling off the back of trucks or other vehicles. Frequently, such pelting results in windshields chipping or cracking. Furthermore, it is not uncommon for automobiles to have their windshields chipped and/or cracked on more than one occasion.

This problem is especially common in areas which encounter winter weather. Typically, salt, gravel or other coarse substances are applied to a road surface after a snowfall to improve automobile traction to the road surface. However, such substances are easily propelled in a rearward direction by the tires of a vehicle towards other oncoming vehicles, often resulting in the oncoming vehicle being struck by the propelled substance. In fact, statistics have shown that, in certain winter weather areas in the U.S., one of two automobiles have their windshields chipped and/or cracked each winter.

Likewise, this problem is also common in areas undergoing construction where dirt, rocks and other objects are strewn across roads. As with the salt and gravel used after snowfalls, such objects are easily propelled towards other oncoming vehicles.

Additionally, this problem may occur any time there is a truck or other vehicle carrying objects not enclosed within the truck or vehicle. Such objects often fly out of the truck or vehicle and strike other oncoming vehicles.

In addition to automobiles, this problem frequently occurs with other types of vehicles including aircraft and boats. For instance, it is not uncommon for construction vehicles to be struck by falling objects, for aircraft to be struck by birds, or boats to be struck by objects in the water or objects falling off other boats.

Furthermore, this problem is not limited to vehicles. It is not uncommon for other types of windows, such as windows on homes or commercial property, to chip, crack or break due to accidents, vandalism or severe weather.

Efforts to address these hazards have focused solely on repairing the chipped or cracked window after such chipping or cracking has occurred. For instance, the vehicle owner may replace the chipped or cracked window. However, this option usually costs several hundred dollars and results in a loss of the use of the vehicle for several hours. Alternatively, if the chip or crack is not substantial, the window may be repaired. However, once again, window repairs are costly and result in a loss of the use of the vehicle while the repair is ongoing. Furthermore, neither of these options, replacing the window or repairing the chip or crack in the window, will prevent the recurrence of the chipping or cracking upon being further struck by another object. Thus, the vehicle owner will be subjected to the repair or replacement costs and the loss of use each time the window is struck and chipped or cracked.

As for windows in homes or commercial property, protection methods are limited. Typically, wood boards or storm shutters are placed over the windows. Although such methods are useful in protecting windows, they create other problems. For instance, the boards are typically nailed into adjacent walls, a process which is tedious and time consuming and which leaves holes in the walls. Furthermore, the boards and storm shutters completely obstruct the windows. Thus, a store owner will be unable to see out of his store and, more importantly, his customers will be unable to see in the store.

The related art is silent in terms of addressing the need to prevent the chipping and cracking of vehicle windows. This is not surprising in light of the fact that prior efforts to address these hazards have been made by the glass industry, which will suffer a reduction in the need for replacement windshields and, consequently, would be harmed, by any apparatus which prevents the chipping and cracking of windshields. Thus, prior efforts teach away from the prevention of chipping and cracking of windshields and focus solely on repairing and replacing the chips and cracks, efforts which maintain the glass industry's production of replacement windshields.

Several devices have been developed to cover automobile windshields. However, most of these devices are merely designed to protect an automobile windshield from snow, ice or freezing rain and, as mentioned above, are typically not suited for preventing the chipping or cracking of windshields. Furthermore, these devices were not intended for vehicles other than automobiles. For example, U.S. Pat. No. 3,874,437 discloses a windshield cover constructed of a flexible piece of plastic with loop forming hems in the bottom and end edges for securement to the automobile and U.S. Pat. No. 3,140,115 discloses a detachable windshield protector constructed of a flexible transparent sheet with hooks, buttons and snaps for securement to the automobile. Both devices are designed to protect a windshield from snow and ice, but, due to their flexible construction, will not prevent the windshield from chipping or cracking when struck by flying objects. Furthermore, both devices are secured to the automobile with loops, hooks, buttons or snaps, which are unattractive and cumbersome to install.

Another device, disclosed in U.S. Pat. No. 4,889,754, is a temporary window designed to cover a hole in a window. This device is constructed of a flexible, transparent film with adhesive on one side for securement to a window. However, as with the devices discussed above, this device, due to its flexible construction, will not prevent the windshield from chipping or cracking when struck by flying objects. It is merely a temporary means to cover a hole in a window until it can be repaired or replaced.

Another device, disclosed in U.S. Pat. No. 3,923,339, is a bullet proof transparent panel which is specifically designed for attachment to the inside of an automobile window by inserting clips or straps around the edges of the window molding. This device will not prevent the chipping or cracking of windshields because it may only be installed on the inside of the windshield. Furthermore, it is difficult to install because it requires removal and replacement of several automobile components.

Accordingly, there is a need in the art for an apparatus which will prevent the chipping and cracking of a vehicle window, thereby eliminating the costs to repair or replace the window and the loss of use of the automobile each time the window is struck by an object. Any such apparatus should be inexpensive, virtually undetectable, adaptable and easily applied to existing vehicle windows and should not obstruct the driver's visibility when operating the vehicle. Ideally, any such apparatus will be capable of being temporarily secured to an existing window and, further, should not damage the window when it is removed therefrom. The present invention is particularly suited to overcome those problems which remain in the art in a manner not previously known.

SUMMARY OF THE INVENTION

The present invention is directed towards an apparatus for protecting a vehicle windshield which is light-weight and virtually undetectable when secured to a windshield and a method for securing the apparatus to an existing windshield. The apparatus of the present invention comprises a main body formed of a substantially thin, clear material, such as plexiglass, of a one-piece construction. The main body includes a top face and a bottom face and is structured and sized to lie in an overlying relation upon a vehicle windshield. The main body may be of generally flat configuration for use with flat windshields or curved configuration for use with curved windshields. In use, the bottom face of the main body is in substantially direct contact with the outer face of the vehicle windshield. Additionally, in order to secure the apparatus to the vehicle windshield in a manner which will make the apparatus virtually undetectable and which will not obstruct the driver's visibility when operating the vehicle, the present invention includes a method for securing the apparatus to an existing windshield.

It is an object of the present invention to provide an apparatus for protecting a vehicle window which is adaptable and easily applied to all types of vehicle windows.

It is a further object of the present invention to provide an apparatus for protecting a vehicle window which can be removable secured to a vehicle windshield.

It is also an object of the present invention to provide an apparatus for protecting a vehicle window which is light-weight and virtually undetectable.

It is another object of the present invention to provide an apparatus for protecting a vehicle window which will not obstruct the driver's visibility when operating the automobile.

It is yet another object of the present invention to provide a method for securing an apparatus for protecting a vehicle window to a vehicle windshield in a manner which will render the apparatus virtually undetectable and which will not obstruct the driver's visibility when operating the vehicle.

These and other objects and advantages of the present invention will become more readily apparent in the description which follows.

BRIEF DESCRIPTION OF THE DRAWINGS

For a fuller understanding of the nature of the present invention, reference should be had to the following detailed description, taken in connection with the accompanying drawings in which:

Like reference numerals refer to like parts throughout the several views of the drawings.

FIG. 2 is a perspective view of the present invention showing the apparatus and method of securing the apparatus to a vehicle windshield with the adhesive on the windshield.

DETAILED DESCRIPTION OF THE PREFERRED EMBODIMENT

Figure 1:
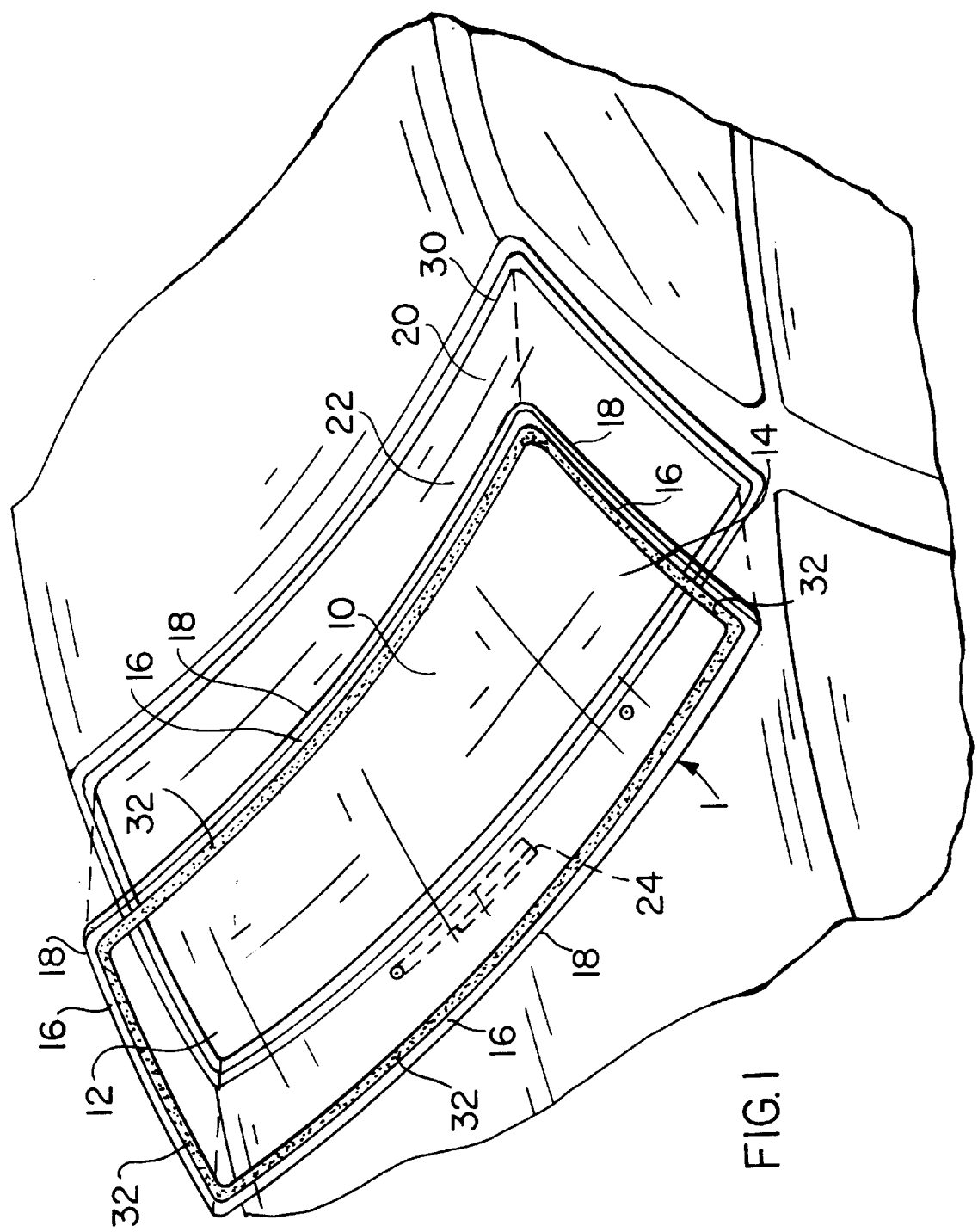
FIG. 1 is a perspective view of the present invention showing the apparatus and method of securing the apparatus to a vehicle having a flat windshield.

As shown in FIG. 1 and 2, the present invention is directed towards an apparatus 1 for protecting a vehicle window 20 which is light-weight and virtually undetectable when secured to a window. The apparatus of the present invention comprises a main body 10 having a top face 12 and a bottom face 14. The main body 10 is formed of a substantially thin, clear material, such as plexiglass, of a one-piece construction. In the preferred embodiment, the main body 10 is structured and sized to lie in an overlying relation upon a vehicle windshield 20 so that, in use, the bottom face 14 of the main body 10 is in substantially direct contact with the outer surface 22 of the vehicle windshield 20. The main body 10 may be either of a generally flat, rectangular configuration for use with vehicles having flat windshields or, alternatively, a generally curved, rectangular configuration for use with vehicles having curved windshields. The main body 10 may also be structured and sized to cover other windows on the vehicle, if necessary.

The present invention is further directed towards a method for removably securing the apparatus for protecting a vehicle windshield I to a vehicle windshield 20. The first step consists of removing the windshield wiper arms 24 from the vehicle. The vehicle windshield 20 is then cleaned, preferably with an alcohol based cleaner, to remove all debris, and then with a window cleaner to remove all streaks.

Next, ensure that the vehicle's windshield molding 30 is securely in place and will not move. If it is not fully secured, use a clear adhesive to firmly secure the molding.

After the molding 30 is fully secured, apply double-sided tape 32, such as Buttel tape, mi around the outer perimeter 16 of the bottom face 14 of the main body 10 approximately ¼" from the outer edge 18 of the main body 10. After the tape 32 has been secured around the entire outer perimeter 16 of the bottom face 14 of the main body 10, peel the backing off the side of the tape 32 not secured to the bottom face 14 of the main body 10.

Position the main body 10 on the outer surface 22 of the vehicle windshield 20 so that the bottom face 14 of the main body 10 lies in overlying relation upon the outer surface 22 of the vehicle windshield 20. The main body 10 will be seated within the windshield molding 30 and centered on the outer surface 22 of the vehicle windshield 20 when properly positioned. After the main body 10 is properly positioned over the outer surface 22 of the vehicle windshield 20, a rubber roller 40 is rolled over the top face 12 of the main body 10 to smooth out the tape 32 between the outer surface 22 of the vehicle windshield 20 and the bottom face 14 of the main body 10, thereby adhering the tape 32 to the outer surface 22 of the vehicle windshield 20 and creating a uniform bond between the bottom face 14 of the main body 10 and the outer surface 22 of the vehicle windshield 20.

The last step consists of replacing the windshield wiper arms 26.

To remove the apparatus 1 from the windshield 20, first remove the windshield wiper arms 26 from the vehicle. Next, lift one of the outer edges 18 of the main body 10 by inserting a thin, rigid plastic object between the windshield molding 30 and the main body 10 and carefully prying the outer edge 18 of the main body 10 off of the outer surface 22 of the vehicle windshield 20 so as to not scratch or crack the main body 10 or the vehicle windshield 20. After lifting one of the outer edges 18 of the main body 10 off of the outer surface 22 of the vehicle windshield 20, grasp that outer edge 18 and lift the main body 10 off of the outer surface 22 of the vehicle windshield 20.

If any tape 32 remains secured to the outer surface 22 of the vehicle windshield 20, remove such tape 32 from the vehicle windshield 20. Apply a window cleaner to the outer surface 22 of the vehicle windshield 20 and scrape any remaining adhesive off the outer surface 22 of the vehicle windshield 20 with a razor blade or similar device, being careful not to scratch or crack the vehicle windshield 20. The last step consists of cleaning the vehicle windshield 20 and replacing the windshield wiper arms 26.

Various changes may be made within the spirit and scope of the invention as described above including, but not limited to, using an adhesive other than tape 32 to secure the main body 10 to the vehicle windshield 20 or adding a decorative molding around the outer edge 18 of the main body 10. Specifically, a uniform bead of clear waterproof silicon adhesive 40 may be applied around the outer surface 22 of the vehicle windshield 20 approximately one inch from the windshield molding 3 0. In this second preferred embodiment, a one and one-half inch long by one-eighth inch wide clear, flexible tube 42 may be placed along the bead of silicon adhesive 40 at the bottom center of the vehicle windshield 20 to ensure proper airflow into and out of the space between the vehicle windshield 20 and the main body 10 so as to prevent the buildup of air pressure therein. Additionally, the apparatus is not limited to protecting vehicle windows. It may also be utilized to protect windows in homes, commercial property or any other type of window. In fact, the apparatus of the present invention may be ideally suited to protect such windows from vandalism, hurricanes or other situations which typically result in cracked, chipped or broken windows.

What is claimed is:

1. An apparatus for protecting a vehicle windshield comprising:

a main body having a top face, an opposite bottom face, an outer perimeter and an outer edge surrounding said outer perimeter, said main body being formed of a substantially thin, clear material of a one-piece construction and structured to lie in an overlying relation upon an outer surface of a vehicle windshield so that said bottom face of said main body is in substantially direct contact with the outer surface of the vehicle windshield, an adhesive material on said bottom face of said main body, said adhesive material being structured to removably secure said main body to the outer surface of the vehicle windshield and a flexible tube-like member secured to a portion of said adhesive material between said bottom face of said main body and said vehicle windshield.

2. An apparatus for protecting a vehicle windshield as recited in claim 1 wherein said adhesive material is clear waterproof silicon.

3. An apparatus for protecting a vehicle windshield as recited in claim 1 wherein said clear material is plexiglas.

4. An apparatus for protecting a vehicle windshield as recited in claim 1 wherein said main body comprises a generally flat, rectangular configuration.

5. An apparatus for protecting a vehicle windshield as recited in claim 1 wherein said main body comprises a generally curved, rectangular configuration.

6. An apparatus for protecting a vehicle windshield comprising:

a main body having a top face, an opposite bottom face, an outer perimeter and an outer edge surrounding said outer perimeter, said main body being formed of a substantially thin, clear material of a one-piece construction and structured to lie in an overlying relation upon the outer surface of a vehicle windshield so that said bottom face of said main body is in substantially direct contact with the outer surface of the vehicle windshield, a bead of clear waterproof silicon adhesive on said outer surface of said vehicle windshield, said silicon adhesive being structured to removably secure said main body to the outer surface of the vehicle windshield, and a flexible tube-like member secured to a portion of said silicon adhesive between said bottom face of said main body and said vehicle windshield.

7. An apparatus for protecting a vehicle windshield as recited in claim 6 wherein said clear material is plexiglas.

8. An apparatus for protecting a vehicle windshield as recited in claim 6 wherein said main body comprises a generally flat, rectangular configuration.

9. An apparatus for protecting a vehicle windshield as recited in claim 6 wherein said main body comprises a generally curved, rectangular configuration.

\* \* \* \* \*